(12) United States Patent
Subramanian et al.

(10) Patent No.: US 12,715,529 B2
(45) Date of Patent: Aug. 25, 2026

(54) SYSTEMS AND METHODS FOR ANALYZING BRAKE WEAR OF CONVEYOR LIFT TABLE MOTOR TO PREDICT DOWNTIME EVENTS

(71) Applicant: GM GLOBAL TECHNOLOGY OPERATIONS LLC, Detroit, MI (US)

(72) Inventors: Alex Subramanian, Bengaluru (IN); Adriano Bardelin, Macomb, MI (US); Suchit S. Walekar, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 19/032,622

(22) Filed: Jan. 21, 2025

(65) Prior Publication Data

US 2026/0208806 A1 Jul. 23, 2026

(51) Int. Cl.
*B62D 65/18* (2006.01)

(52) U.S. Cl.
CPC .................................... *B62D 65/18* (2013.01)

(58) Field of Classification Search
CPC ... B62D 65/18; B66F 3/46; B66F 7/20; B66F 7/10; B66F 7/00
See application file for complete search history.

(56) References Cited

FOREIGN PATENT DOCUMENTS

| | | | |
|---|---|---|---|
| DE | 102008036288 A1 * | 2/2010 | ................ B66F 3/46 |
| DE | 202013007358 U1 | 11/2014 | |
| DE | 102008036288 B4 | 8/2015 | |
| DE | 102011000211 B4 | 4/2019 | |
| DE | 102019119728 B3 | 10/2020 | |

OTHER PUBLICATIONS

English translation DE102008036288 (Year: 2008).*
German Office Action from counterpart DE1020251100365, dated Oct. 18, 2025.

* cited by examiner

*Primary Examiner* — Jason L Vaughan
*Assistant Examiner* — Amanda Kreiling

(57) ABSTRACT

A system for positioning a product along an assembly line including: a motor having a brake and an output shaft in cooperation with a platform by way of a linkage, rotation of the output shaft in a first direction rotates the linkage to an upper position to raise the platform and rotation of the output shaft in a second direction rotates the linkage to a lower position to lower the platform, the brake is configured to stop movement of the output shaft; a sensor configured to identify movement of the linkage between the lower position and the upper position; and a controller configured to receive inputs from the sensor, measure a cycle time of each one of a plurality of movement cycles of the linkage between the lower position and the upper position based on the inputs, and identify cycle times that are progressively decreasing or increasing.

20 Claims, 5 Drawing Sheets

50
54
82
62
72
70
74
80
X
60
A 50
54
B
72'
62
80
82
74
72
X
60

SYSTEMS AND METHODS FOR ANALYZING BRAKE WEAR OF CONVEYOR LIFT TABLE MOTOR TO PREDICT DOWNTIME EVENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for analyzing brake wear of a conveyor lift table motor to predict occurrence of a downtime event.

A conveyor lift table is used during manufacturing to facilitate transport of a particular product about an assembly line. The product may be any suitable product being manufactured, such as a vehicle frame, other vehicle product, or a non-vehicular product. The lift table is configured to be raised and lowered by a motor, which includes a mechanical brake to hold the accurate position for proper transfer of the job. Should the motor brake require service or replacement, the lift table may not be operational during the service, which may disrupt the assembly line and slow or stop manufacturing.

SUMMARY

The present disclosure provides for, in various features, a system for positioning a product along an assembly line. The system includes: a platform configured to support the product and be raised and lowered; a motor including a brake and an output shaft in cooperation with the platform by way of a linkage, rotation of the output shaft in a first direction rotates the linkage to an upper position to raise the platform and rotation of the output shaft in a second direction opposite to the first direction rotates the linkage to a lower position to lower the platform, the brake is configured to stop movement of the output shaft to stop the linkage at the upper position and the lower position; a sensor configured to identify movement of the linkage between the lower position and the upper position; and a controller configured to receive inputs from the sensor, measure a cycle time of each one of a plurality of movement cycles of the linkage between the lower position and the upper position based on the inputs, and identify a series of recent cycle times that are progressively decreasing or increasing relative to previously observed cycles times. The controller is configured to generate a service alert for the brake of the motor in response to the identification of the series of recent cycle times that are progressively decreasing or increasing relative to the previously observed cycle times.

In further features, the platform is configured to support an automotive frame.

In further features, the product is configured for use in a cross-transfer system of the assembly line.

In further features, the platform includes rollers configured for transferring the product onto and off of the platform.

In further features, the brake includes a brake disc and the service alert includes a notification to check the brake disc for wear.

In further features, the lower position of the linkage and the upper position of the linkage are 180° apart.

In further features, the sensor includes a first sensing device configured to identify when the linkage is at the upper position and a second sensing device configured to identify when the linkage is at the lower position, the sensor configured to measure the cycle time of the linkage as movement between the first sensing device and the second sensing device.

In further features, the controller is configured to isolate the cycle times of the motor from other equipment of the assembly line.

In further features, the controller is configured to receive the cycle times of each one of the plurality of movement cycles for each day of a previous 180 days.

In further features, the controller is configured to identify a long-term average of the plurality of movement cycles and a short-term average of the plurality of movement cycles, and the series of progressively decreasing cycle times are included with the short-term average and are lower than the long-term average of the plurality of movement cycles.

In further features, the long-term average is based on the plurality of movement cycles measured over a preceding 180 days, and the short-term average is based on the plurality of movement cycles measured over a preceding 7 days.

In further features, the controller is configured to exclude outliers of the plurality of movement cycles measured over a preceding seven days by executing a density-based spatial clustering of applications with noise (DBSCAN) algorithm.

In further features, the controller is configured to generate the service alert for the brake of the motor only when the series of progressively decreasing or increasing cycle times are identified within a preceding seven days.

The present disclosure also provides for, in various features, a system for positioning a product along an assembly line. The system includes: a platform configured to support the product and be raised and lowered; a motor including a brake and an output shaft in cooperation with the platform by way of a linkage, rotation of the output shaft in a first direction rotates the linkage to an upper position to raise the platform and rotation of the output shaft in a second direction opposite to the first direction rotates the linkage to a lower position to lower the platform, the brake is configured to stop movement of the output shaft to stop the linkage at the upper position and the lower position; a sensor configured to identify movement of the linkage between the lower position and the upper position; and a controller configured to receive inputs from the sensor, measure a cycle time of each one of a plurality of movement cycles of the linkage between the upper position and the upper position based on the inputs, identify a long-term average of the plurality of movement cycles and a short-term average of the plurality of movement cycles, and identify a series of recent cycle times included in the short-term average that are progressively decreasing relative to the long-term average of the plurality of movement cycles. The controller generates a service alert for the brake of the motor in response to the identification of the series of recent cycle times that are progressively decreasing.

In further features, the lower position of the linkage and the upper position of the linkage are 180° relate to one another.

In further features, the sensor includes a first sensing device configured to identify when the linkage is at the upper position and a second sensing device configured to identify when the linkage is at the lower position, the sensor configured to measure the cycle time of the linkage as movement between the first sensing device and the second sensing device.

The present disclosure still further provides for, in various features, a method including: actuating a motor to raise and lower a platform configured to support a product being transported along an assembly line; identifying with a sensor movement of a linkage connecting the motor to the platform, the movement including rotation of the linkage in a first direction by the motor to an upper position to raise the platform and rotation of the linkage in a second direction by the motor to a lower position to lower the platform, a brake of the motor is configured to stop movement of the linkage at the upper position and the lower position; measuring with a controller in receipt of inputs from the sensor a cycle time of each one of a plurality of movement cycles of the linkage between the upper position and the lower position based on the inputs; identifying with the controller a series of recent cycle times that are progressively decreasing relative to previously observed cycle times; and generating with the controller a service alert for the brake of the motor in response to the identification of the series of recent cycle times that are progressively decreasing.

In further features, the lower position of the linkage and the upper position of the linkage are 180° relative to one another.

In further features, the method includes identifying with the controller a long-term average of the plurality of movement cycles and a short-term average of the plurality of movement cycles. The series of progressively decreasing cycle times are included with the short-term average and are lower than the long-term average of the plurality of movement cycles.

In further features, the method includes generating the service alert for the brake of the motor by the controller only when the series of progressively decreasing cycle times are identified within a preceding predetermined time period.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure includes systems and methods for predicting when a motor of a lift table requires maintenance due to brake wear. The lift table includes a platform configured to be raised and lowered by the motor. The platform is configured to support a product during a manufacturing process of the product. The product may be any suitable product, such as an automotive product or non-automotive product.

A controller is configured to monitor changes in cycle time of the motor, which is a time required to raise and lower the platform. The cycle time of raising and lowering operation of the platform is monitored by the controller and sent to an IT server. In particular, the controller is configured to identify a series of progressively decreasing or increasing cycle times that are different than previously observed consistent cycle times, which likely indicates that the brake of the motor is soon to require maintenance. In response to identifying the series of progressively decreasing cycle times, the controller is configured to generate a service alert for the brake of the motor. The service alert may take the form of any suitable alert, such as an email to an operator of an assembly line including the lift table. The brake of the motor may then undergo preventative maintenance to reduce or eliminate downtime of the motor and the lift table.

Figure 1:
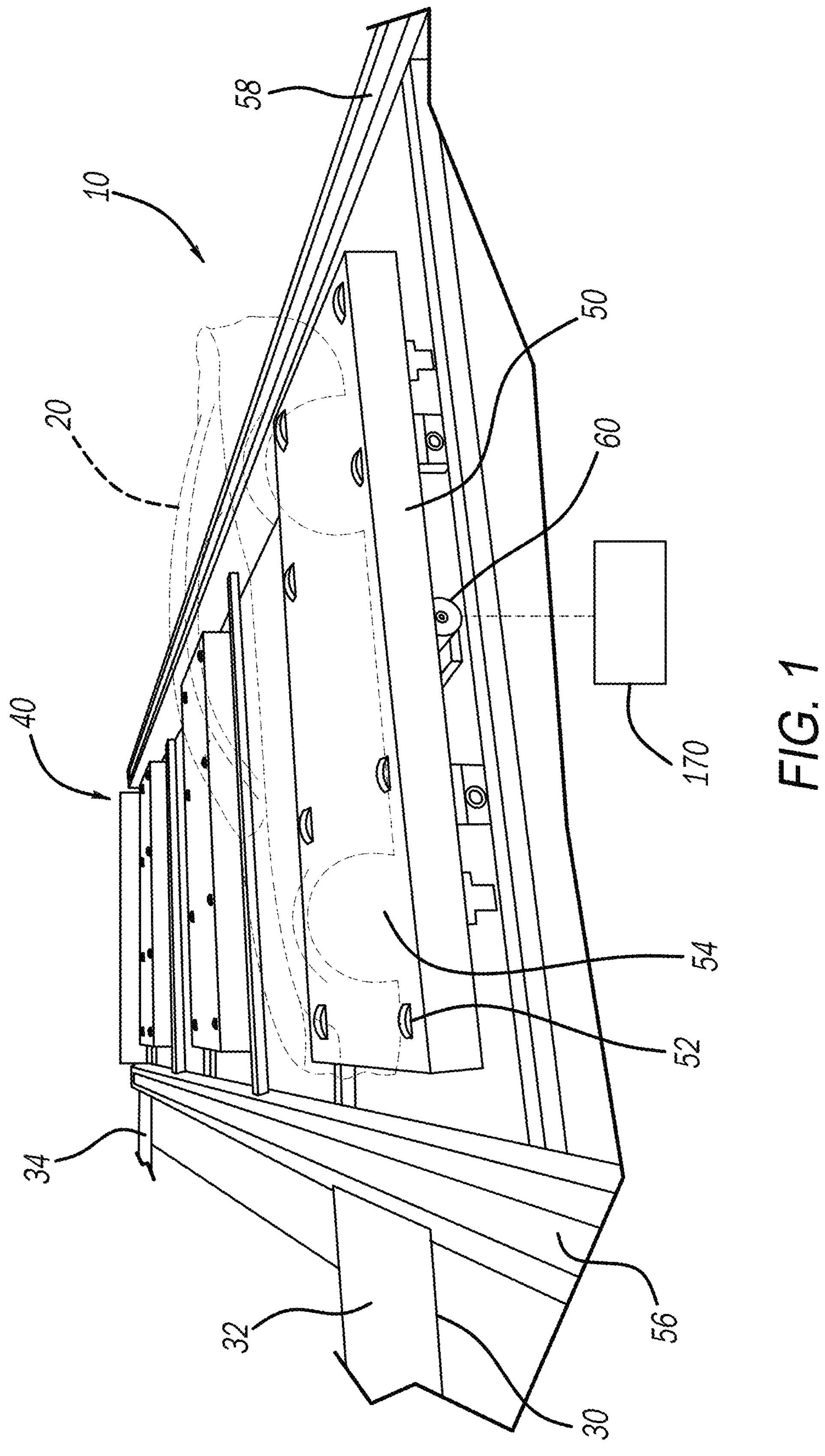
FIG. 1 is a perspective view of a system in accordance with the present disclosure for transporting a product along an assembly line.

FIG. 1 illustrates a system 10 in accordance with the present disclosure for transporting a product 20 along an assembly line 30. The product 20 may be any suitable product being manufactured, such as an automotive frame as illustrated. The product 20 may be any other suitable automotive product as well. The present disclosure is applicable to both automotive and non-automotive applications. Thus, the product 20 may alternatively be any suitable non-automotive product.

The assembly line 30 may be any suitable automotive or non-automotive assembly line, or any other suitable production line, system, process, etc. The assembly line 30 generally includes an input line 32 and an output line 34. Each one of the input line 32 and the output line 34 may include any suitable conveyor system. The input line 32 is configured to transport the product 20 to a cross-transfer system 40, and the output line 34 is configured to transport the product away from the cross-transfer system 40.

The cross-transfer system 40 includes a platform 50, which may be any suitable platform, such as a lift table platform. Any suitable number of the platforms 50 may be included with the cross-transfer system 40. The platform 50 is part of a conveyor lift table configured to be raised and lowered by a motor 60, as described herein. The platform 50 includes rollers 52 at an upper surface 54. The rollers 52 facilitate transfer of the product 20 on to, and off of, the platform 50. On opposite sides of the platforms 50 are conveyor belts or chains. Although conveyor belts are described herein, the conveyor belts may be replaced with, or supplemented by, chains or any other suitable conveying device or apparatus. Specifically, a first belt 56 is between the platforms 50 and both the input line 32 and the output line 34. A second belt 58 is on a side of the platforms 50 opposite to the first belt 56.

The input line 32 is configured to transport the product 20 to the cross-transfer system 40 and onto the upper surface 54 of the platform 50 when the platform 50 is in a raised position. After the product 20 is seated on the upper surface 54, the motor 60 is configured to lower the platform 50. The product 20, or a base that the product 20 is seated on, is longer than the platform 50. Thus, once the platform 50 is lowered the product 20 is supported by, and seated on, the first belt 56 and the second belt 58. The first belt 56 and the second belt 58 are operated to move the product 20 to one or more subsequent platforms downstream of (behind in the orientation of FIG. 1) the platform 50. Each of the subsequent platforms may be raised by a motor to lift the product 20 off of the first belt 56 and the second belt 58 to hold the product 20 in place until the assembly line 30 is ready for the product 20 to be moved out of the cross-transfer system 40 by way of the output line 34. At such time, the subsequent platform will be lower, which will allow the product 20 to be moved to the output line 34 for further processing.

With continued reference to FIG. 1 and additional reference to FIGS. 2, 3A, and 3B, additional details of the motor 60 will now be described. The motor 60 is any suitable electric motor including a rotor and a stator. Attached to the rotor is an output shaft 62. Operation of the motor 60 is controlled by a controller 170. When activated, the motor 60 rotates the output shaft 62 in either a first direction or a second direction, which is opposite to the first direction. With particular reference to FIGS. 3A and 3B, the output shaft 62 is connected to the platform by a linkage 70. The linkage 70 includes an arm 72 and a cam 74. The arm 72 is connected to the output shaft 62, and the cam 74 is connected to the platform 50. The arm 72 is further connected to the cam 74. The linkage 70 may be configured in any suitable manner such that rotation of the output shaft 62 by the motor 60 moves the linkage 70 to raise and lower the platform.

FIG. 3A illustrates the linkage 70 in a lower position A, and the platform 50 lowered. In the lower position A, the arm 72 is aligned along a vertical axis X extending through an axial center of an output shaft 62. The cam 74 is also on the vertical axis X. FIG. 3B illustrates the linkage 70 in an upper position B, and the platform 50 raised. In the upper position B, the arm 72 is aligned along the vertical axis X and oriented 180° relative to the lower position A. Thus, the lower position A and the upper position B of the linkage 70 are 180° relative to each other.

A sensor is included to track movement of the linkage 70 between the lower position A and the upper position B. Any suitable sensor can be used. In the example illustrated in FIG. 3A and FIG. 3B, the sensor includes a first sensing device 80 and a second sensing device 82. The first sensing device 80 is positioned to be proximate to the linkage 70 when the linkage 70 is in the lower position A of FIG. 3A. The second sensing device 82 is positioned to be proximate to the linkage 70 when the linkage 70 is in the upper position B of FIG. 3B. The first sensing device 80 and the second sensing device 82 may be light sensors, or any other suitable sensor configured to identify location of the linkage 70.

Figure 2:
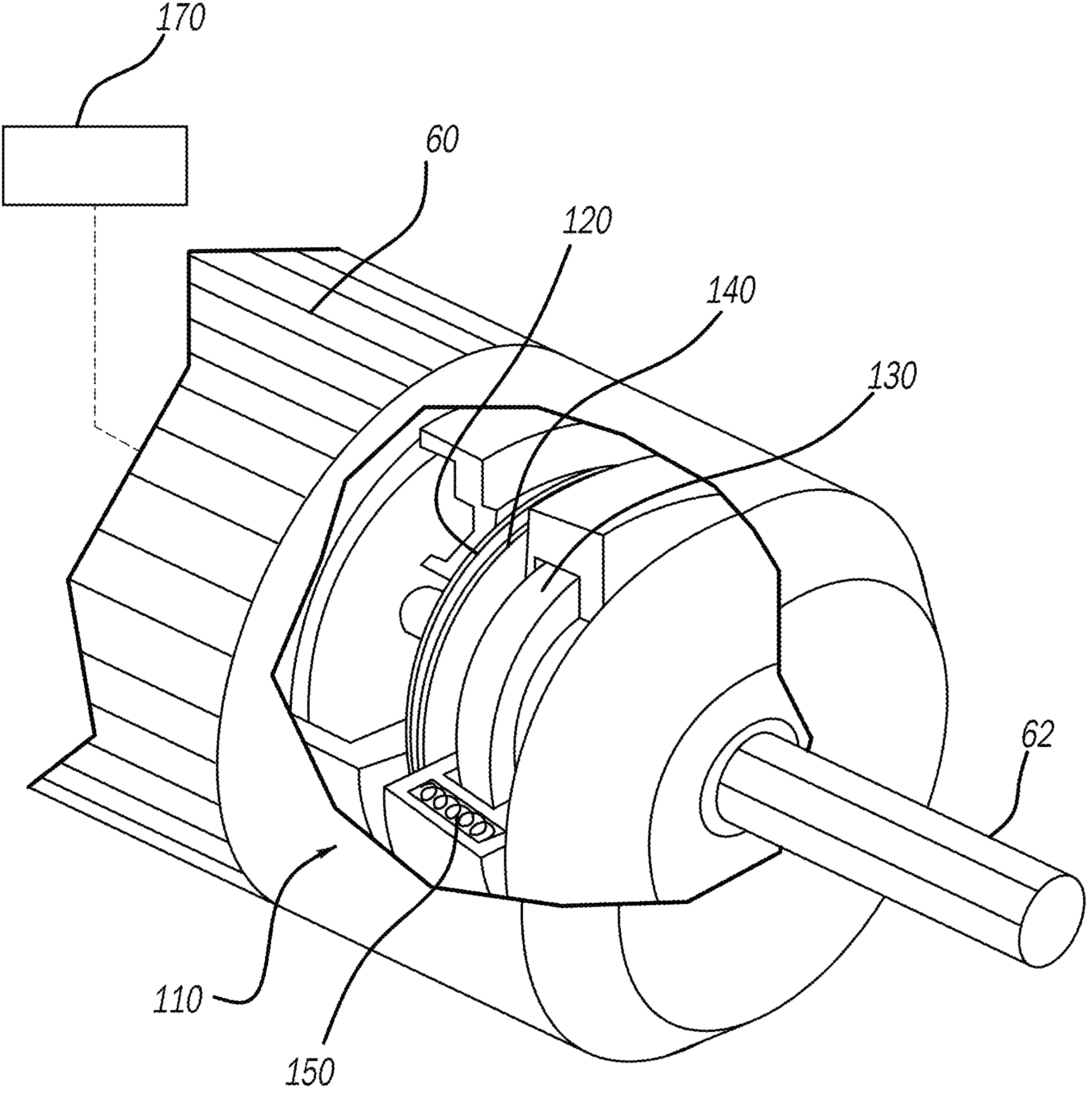
FIG. 2 is a perspective view of a motor of the system of FIG. 1, the motor including a brake and configured to raise and lower a platform of the system.
Figures 3A, 3B:
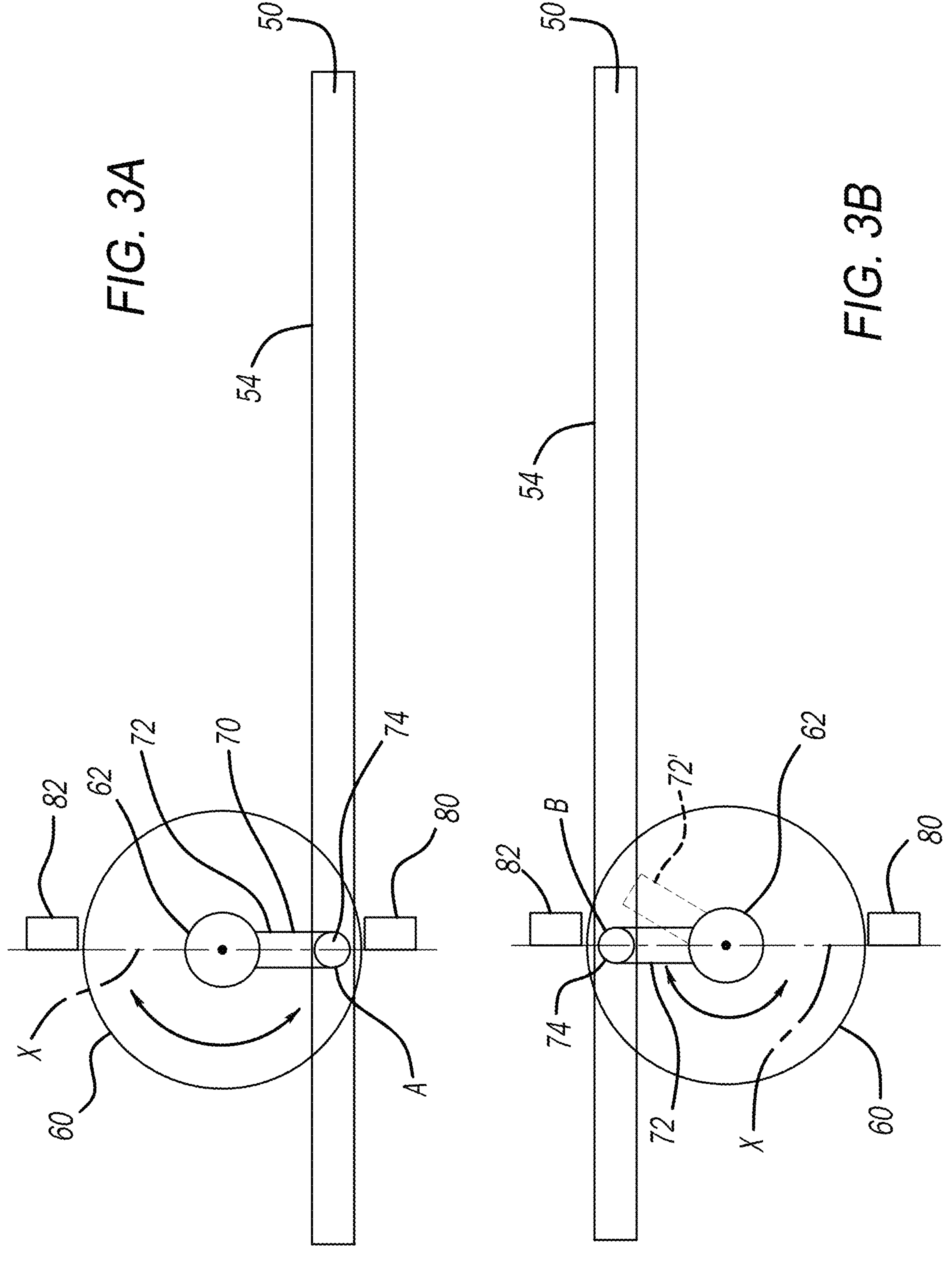
FIG. 3A is a side view of the motor in cooperation with the platform in a lowered position.
FIG. 3B is a side view of the motor in cooperation with the platform in a raised position.

The motor 60 further includes a brake 110, as illustrated in FIG. 2, for example. The brake 110 generally includes a disc 120 mounted to the output shaft 62 such that the disc 120 rotates with the output shaft 62, and such that the disc 120 does not rotate independent of the output shaft 62. The disc 120 is a friction disc including any suitable friction material. The brake 110 further includes a coil 130 and a pressure plate 140. The output shaft 62 (or a shaft connected thereto) extends through the pressure plate 140, and the pressure plate 140 is mounted to be stationary independent of rotation of the output shaft 62 and the disc 120. Between the coil 130 and the pressure plate 140 are springs 150. When the coil 130 is energized, the coil 130 pulls the pressure plate 140 towards the coil 130 away from the disc 120, and the springs 150 are compressed. When the coil 130 is not energized, the springs 150 push the pressure plate 140 away from the coil 130 into engagement with the disc 120. The pressure plate 140, which is rotationally fixed, contacts the disc 120, and friction between the pressure plate 140 and the disc 120 stops rotation of the disc 120 to brake the output shaft 62. In this manner, the brake 110 stops rotation of the output shaft 62 to lock the linkage 70 at the lower position A or the upper position B, thereby locking the platform 50 in the lowered position of FIG. 3A or the raised position of FIG. 3B.

The amount of time it takes for the linkage 70 to move from the lower position A to the upper position B to raise the platform 50 is a cycle time for the motor 60 to raise the platform 50. Likewise, the amount of time for the linkage 70 to move from the upper position B to the lower position A to lower the platform 50 is a cycle time for the motor 60 to lower the platform 50. The controller 170 is configured to receive inputs from the first sensing device 80 and the second sensing device 82 identifying location of the linkage 70 relative to the lower position A and the upper position B. Movement of the linkage 70 from the lower position A to the upper position B is a movement cycle of the linkage 70. Movement of the linkage 70 from the upper position B to the lower position A is also a movement cycle.

Based on the inputs from the first sensing device 80 and the second sensing device 82, the controller 170 is configured to measure a cycle time of each one of a plurality of movement cycles of the linkage 70 between the lower position A and the upper position B, and vice versa, and send the cycle times to the controller 170, which may be included with any suitable IT server. The controller 170, and particularly an algorithm thereof, is further configured to identify a series of recent cycle times that are progressively decreasing or increasing relative to previously observed cycle times. In response to identification of the series of recent cycle times that are progressively decreasing or increasing, the controller 170 is configured to generate a service alert for the brake 110 of the motor 60, as explained below and illustrated in the method of FIG. 5.

Figure 4:
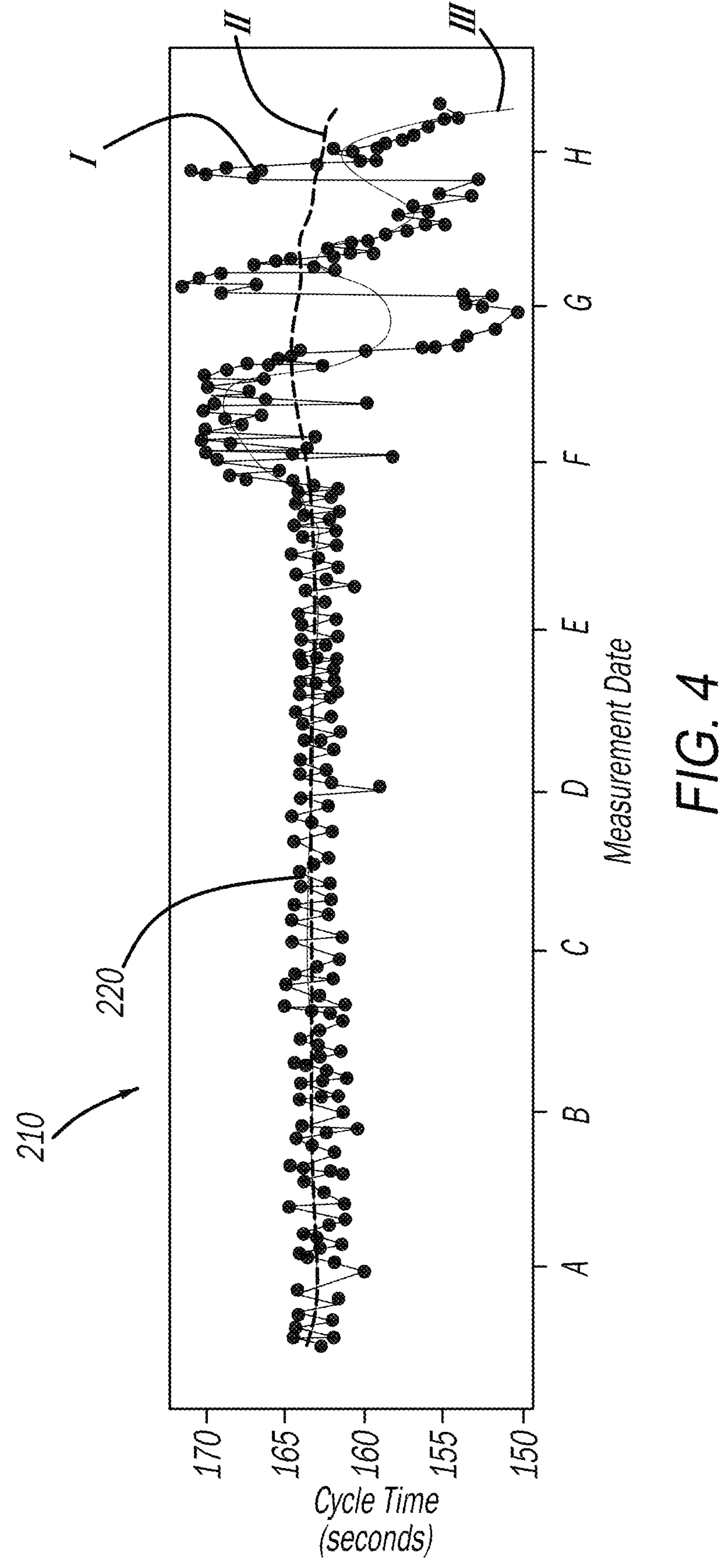
FIG. 4 is a graph of cycle times for the motor measured on various measurement dates.

FIG. 4 is a graph 210 of various cycle times 220 measured by the controller 170 on various dates based on inputs from the first sensing device 80 and the second sensing device 82. FIG. 4 illustrates cycle times for raising the platform 50 from the lower position of FIG. 3A to the upper position of FIG. 3B. Thus, the cycle times of FIG. 4 represent the time that it takes the linkage 70 to move from the lower position A (FIG. 3A) to the upper position B (FIG. 3B). Each cycle time 220 of FIG. 4 is an aggregate cycle time for a particular day. The cycle times 220 are connected in FIG. 4 along line I. Any suitable date range may be used, such as the preceding 180 days. The controller 170 is configured to calculate a moving average of the cycle times 220 over both a long-term period and a short-term period. The long-term period may be the preceding 180 days, for example. The short-term period may be the preceding 7 days, for example. FIG. 4 illustrates an exemplary long-term average at II, and an exemplary short-term average at III. Starting at about date F, the cycle times for raising the platform 50 progressively increase relative to the long-term average II. This may be the result of, for example, "overtightening" of the brake 110 caused by a technician whereby the pressure plate 140 is generating excess friction against the disc 120. The brake 110 is thus excessively slowing movement of the linkage 70 and increasing cycle time. The brake 110 is decelerating the movement faster, which causes the disc 120 to stop earlier. With a new position of start, the next cycle will take longer to reach the position of the sensing devices 80 or 82.

Just prior to date G, the short-term average cycle time for raising the platform 50 progressively decreases relative to the long term-term average, as represented by line III dropping progressively lower than line II. This is most likely the result of the friction material on the disc 120 wearing down, which inhibits the ability of the brake 110 to slow movement of the output shaft 62 and of the linkage 70 as the linkage 70 approaches the upper position B. In some cases, the arm 72 may move beyond, or overshoot, the upper position B as illustrated in FIG. 3B. FIG. 3B illustrates the arm 72', which has moved beyond the upper position B. Should the linkage move beyond the upper position B, the platform 50 will not be vertically aligned with the input line 32 (or the output line 34), which will make it difficult, or impossible, to transfer the product 20 into and off of the upper surface 54 of the platform 50.

Figure 5:
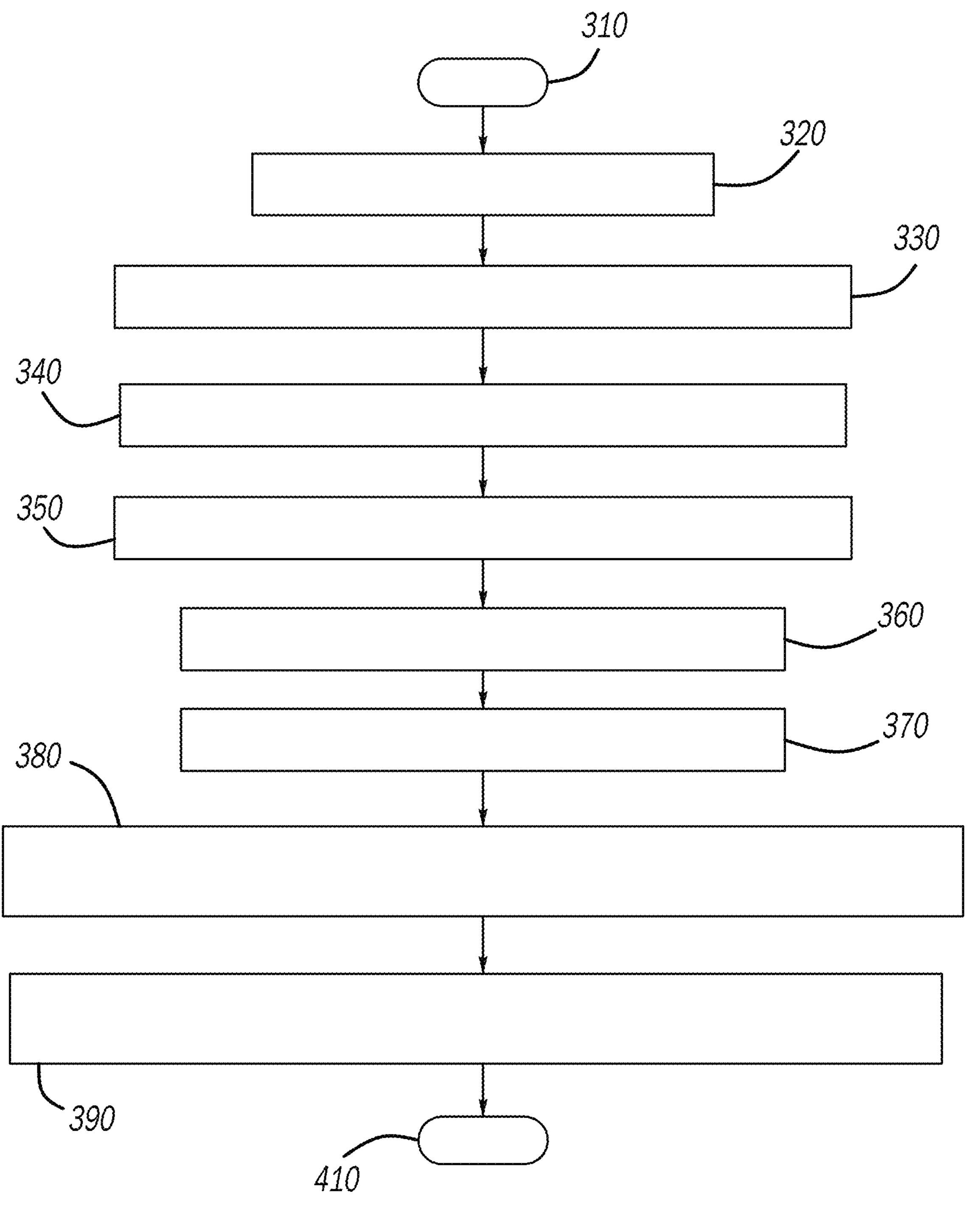
FIG. 5 is a method in accordance with the present disclosure for transporting a product along an assembly line.

FIG. 5 illustrates a method of operation of the system 10, or any other suitable system configured to assess operational health of the brake 110, or any other suitable brake. Although the method is described as being carried out by the controller 170, the method may be carried out by any other suitable controller. The method may be performed in the order illustrated in FIG. 5, or any suitable order. The method begins at block 310 when activated by a technician of any other suitable user. From block 310, the method proceeds to block 320. At block 320, the controller 170 is configured to isolate cycle times of the motor 60 and the linkage 70 connected to the platform 50 from the cycle times of a plurality of other platforms or other equipment of the assembly line 30 or a factory generally. For example, the controller 170 is configured to identify timing and magnitude of input voltage to the motor 60, and cycle times of the motor 60, that are unique to the motor 60. The controller 170 is configured to filter out and disregard cycle times not unique to the motor 60.

From block 320, the method proceeds to block 330. At block 330, the method is configured to aggregate the cycle times for each day of a measurement period. For example and as illustrated in FIG. 4, each one of the cycle times 220 is an aggregate cycle time for a particular measurement date. From block 330, the method proceeds to block 340. At block 340, the controller 170 is configured to apply any suitable quality control metrics to the measured cycle time data. For example, the controller 170 may be configured to acquire a minimum of 100 cycle time data points per measurement day. From block 340, the method proceeds to block 350. At block 350, the controller 170 is configured to identify and ignore any recently observed outlier or anomaly cycle times in any suitable manner. For example, the controller 170 is configured to use a density-based special clustering of applications with noise (DBSCAN) algorithm to filter out any "noise" in the form of outlier or anomaly cycle times. For example, FIG. 4 illustrates an outlier cycle time 220 at measurement date D of about 160 seconds. Using DBSCAN or any other suitable algorithm, the controller 170 is configured to ignore this cycle time data point.

From block 350 the controller 170 is configured to proceed to block 360. At block 360, the controller 170 is configured to identify a long-term moving average of the cycle times 220. FIG. 4 illustrates an exemplary long-term moving average at line II. The long-term moving average may be taken over the preceding 180 days, or any other suitable long-term time period. At block 370, the controller 170 is configured to identify a short-term moving average of the cycle times 220. FIG. 4 illustrates an exemplary short-term moving average at line III. The short-term moving average may be taken over the preceding 7 days, or any other suitable short-term time period.

At block 380, the controller 170 is configured to compare the short-term moving average of the cycle times 220 along line III to the long term moving-average of the cycle times along line II, and to identify any recent trends of deviation of the short-term moving average relative to the long-term moving average. For example and as illustrated in FIG. 4, the most recent short-term cycle times 220 along long III are progressively becoming shorter relative to the long-term moving average along line II. This deviation indicates that the brake 110 is unable to sharply stop the output shaft 62, and that the disc 120 may be skidding relative to the pressure plate 140 due to the disc 120 becoming worn (and specifically friction material of the disc 120 experiencing wear). At block 390, the controller 170 is configured to generate a service alert for the brake 110 in response to the identification of the deviation in the short-term of the cycle times 220 along line III relative to line II. The service alert may be any suitable alert, such as any suitable email to an operator or technician instructing the technician to check the brake 110 for service (e.g., replacement of the disc 120 for a disc with new friction material). Such preventative maintenance can reduce the downtime of the motor 60 and the brake 110, and reduce the downtime of the overall assembly line 30. The controller 170 may also be configured to generate a service alert in response to identification of the short-term cycle as being progressively greater than the long-term average of the cycle times 220 along line II of FIG. 4, which may occur if the brake 110 is calibrated too tightly whereby friction between the disc 120 and the pressure plate 140 is excessive.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for positioning a product along an assembly line, the system comprising:

a platform configured to support the product and be raised and lowered;

a motor including a brake and an output shaft in cooperation with the platform by way of a linkage, rotation of the output shaft in a first direction rotates the linkage to an upper position to raise the platform and rotation of the output shaft in a second direction opposite to the first direction rotates the linkage to a lower position to lower the platform, the brake is configured to stop movement of the output shaft to stop the linkage at the upper position and the lower position;

a sensor configured to identify movement of the linkage between the lower position and the upper position; and a controller configured to receive inputs from the sensor, measure a cycle time of each one of a plurality of movement cycles of the linkage between the lower position and the upper position based on the inputs, and identify a series of recent cycle times that are progressively decreasing or increasing relative to previously observed cycles times, wherein the controller is configured to generate a service alert for the brake of the motor in response to the identification of the series of recent cycle times that are progressively decreasing or increasing relative to the previously observed cycle times.

2. The system of claim 1, wherein the platform is configured to support an automotive frame.

3. The system of claim 1, wherein the product is configured for use in a cross-transfer system of the assembly line.

4. The system of claim 1, wherein the platform includes rollers configured for transferring the product onto and off of the platform.

5. The system of claim 1, wherein the brake includes a brake disc and the service alert includes a notification to check the brake disc for wear.

6. The system of claim 1, wherein the lower position of the linkage and the upper position of the linkage are 180° apart.

7. The system of claim 1, wherein the sensor includes a first sensing device configured to identify when the linkage is at the upper position and a second sensing device configured to identify when the linkage is at the lower position, the sensor configured to measure the cycle time of the linkage as movement between the first sensing device and the second sensing device.

8. The system of claim 1, wherein the controller is configured to isolate the cycle times of the motor from other equipment of the assembly line.

9. The system of claim 1, wherein the controller is configured to receive the cycle times of each one of the plurality of movement cycles for each day of a previous 180 days.

10. The system of claim 1, wherein:

the controller is configured to identify a long-term average of the plurality of movement cycles and a short-term average of the plurality of movement cycles, and the series of progressively decreasing cycle times are included with the short-term average and are lower than the long-term average of the plurality of movement cycles.

11. The system of claim 10, wherein the long-term average is based on the plurality of movement cycles measured over a preceding 180 days, and the short-term average is based on the plurality of movement cycles measured over a preceding 7 days.

12. The system of claim 1, wherein the controller is configured to exclude outliers of the plurality of movement cycles measured over a preceding seven days by executing a density-based spatial clustering of applications with noise (DBSCAN) algorithm.

13. The system of claim 1, wherein the controller is configured to generate the service alert for the brake of the motor only when the series of progressively decreasing or increasing cycle times are identified within a preceding seven days.

14. A system for positioning a product along an assembly line, the system comprising:

a platform configured to support the product and be raised and lowered;

a motor including a brake and an output shaft in cooperation with the platform by way of a linkage, rotation of the output shaft in a first direction rotates the linkage to an upper position to raise the platform and rotation of the output shaft in a second direction opposite to the first direction rotates the linkage to a lower position to lower the platform, the brake is configured to stop movement of the output shaft to stop the linkage at the upper position and the lower position;

a sensor configured to identify movement of the linkage between the lower position and the upper position; and a controller configured to receive inputs from the sensor, measure a cycle time of each one of a plurality of movement cycles of the linkage between the upper position and the upper position based on the inputs, identify a long-term average of the plurality of movement cycles and a short-term average of the plurality of movement cycles, and identify a series of recent cycle times included in the short-term average that are progressively decreasing relative to the long-term average of the plurality of movement cycles, wherein the controller generates a service alert for the brake of the motor in response to the identification of the series of recent cycle times that are progressively decreasing.

15. The system of claim 14, wherein the lower position of the linkage and the upper position of the linkage are 180° relate to one another.

16. The system of claim 15, wherein the sensor includes a first sensing device configured to identify when the linkage is at the upper position and a second sensing device configured to identify when the linkage is at the lower position, the sensor configured to measure the cycle time of the linkage as movement between the first sensing device and the second sensing device.

17. A method comprising:

actuating a motor to raise and lower a platform configured to support a product being transported along an assembly line;

identifying with a sensor movement of a linkage connecting the motor to the platform, the movement including rotation of the linkage in a first direction by the motor to an upper position to raise the platform and rotation of the linkage in a second direction by the motor to a lower position to lower the platform, a brake of the motor is configured to stop movement of the linkage at the upper position and the lower position;

measuring with a controller in receipt of inputs from the sensor a cycle time of each one of a plurality of movement cycles of the linkage between the upper position and the lower position based on the inputs;

identifying with the controller a series of recent cycle times that are progressively decreasing relative to previously observed cycle times; and generating with the controller a service alert for the brake of the motor in response to the identification of the series of recent cycle times that are progressively decreasing.

18. The method of claim 17, wherein the lower position of the linkage and the upper position of the linkage are 180° relative to one another.

19. The method of claim 17, further comprising identifying with the controller a long-term average of the plurality of movement cycles and a short-term average of the plurality of movement cycles, wherein the series of progressively decreasing cycle times are included with the short-term average and are lower than the long-term average of the plurality of movement cycles.

20. The method of claim 17, further comprising generating the service alert for the brake of the motor by the controller only when the series of progressively decreasing cycle times are identified within a preceding predetermined time period.

* * * * *